United States Patent
Chen et al.

(10) Patent No.: US 10,337,733 B2
(45) Date of Patent: Jul. 2, 2019

(54) METHOD AND APPARATUS FOR USING EXCESS HEAT FROM POWER PLANT FLUE GAS TO DRY BIOMASS FUEL

(71) Applicant: ZHONGYING CHANGJIANG INTERNATIONAL NEW ENERGY INVESTMENT CO., LTD., Wuhan (CN)

(72) Inventors: Yilong Chen, Wuhan (CN); Shuchuan Hu, Wuhan (CN); Yanfeng Zhang, Wuhan (CN)

(73) Assignee: ZHONGYING CHANGJIANG INTERNATIONAL NEW ENERGY INVESTMENT CO., LTD., Wuhan (CN)

( * ) Notice: Subject to any disclaimer, the term of this patent is extended or adjusted under 35 U.S.C. 154(b) by 235 days.

(21) Appl. No.: 15/494,572

(22) Filed: Apr. 24, 2017

(65) Prior Publication Data
US 2017/0227215 A1    Aug. 10, 2017

Related U.S. Application Data

(63) Continuation-in-part of application No. PCT/CN2015/092501, filed on Oct. 22, 2015.

(30) Foreign Application Priority Data

Oct. 24, 2014   (CN) .......................... 2014 1 0578212

(51) Int. Cl.
*F23G 5/04*   (2006.01)
*F26B 15/18*  (2006.01)
(Continued)

(52) U.S. Cl.
CPC ............... *F23G 5/04* (2013.01); *F23G 5/444* (2013.01); *F23G 5/46* (2013.01); *F26B 15/18* (2013.01); *F26B 17/02* (2013.01); *F26B 17/08* (2013.01); *F26B 21/14* (2013.01); *F26B 23/001* (2013.01); *F23G 2201/101* (2013.01);
(Continued)

(58) Field of Classification Search
CPC ............... F23G 5/04; F23G 5/444; F23G 5/46
See application file for complete search history.

(56) References Cited

U.S. PATENT DOCUMENTS 4,017,254 A * 4/1977 Jones ........................ F23B 5/04
                                                       110/189
4,414,813 A * 11/1983 Knapp .................... F01K 23/06
                                                       60/39.182
(Continued)

*Primary Examiner* — Nathaniel Herzfeld
(74) *Attorney, Agent, or Firm* — Matthias Scholl P.C.; Matthias Scholl

(57) ABSTRACT

A method for drying biomass fuel using waste heat of flue gas from a power plant. The method includes: 1) stepwise recovering, by multi-stage condensation, sensible heat of flue gas; stepwise heating air using the sensible heat, to yield first-stage dry air and second-stage dry air; 2) convectively drying and dehydrating biomass fuel using the first-stage dry air having a temperature of between 150 and 180° C.; 3) further convectively drying and dehydrating the biomass fuel using the second-stage dry air having a temperature of between 80 and 100° C.; and 4) drying and dehydrating the biomass fuel using the third-stage dry air having a temperature of less than or equal to 25° C.

14 Claims, 4 Drawing Sheets

(51) Int. Cl.
  *F26B 21/14* (2006.01)
  *F23G 5/44* (2006.01)
  *F23G 5/46* (2006.01)
  *F26B 17/02* (2006.01)
  *F26B 17/08* (2006.01)
  *F26B 23/00* (2006.01)

(52) U.S. Cl.
  CPC .... *F23G 2205/122* (2013.01); *F23G 2206/10* (2013.01); *F23K 2201/20* (2013.01); *F26B 2200/02* (2013.01); *Y02P 70/40* (2015.11); *Y02P 70/405* (2015.11)

(56) References Cited

U.S. PATENT DOCUMENTS

| | | | |
|---|---|---|---|
| 6,138,381 A * | 10/2000 | ÅNG.byhammar | F26B 23/001 34/468 |
| 2009/0000144 A1 * | 1/2009 | Berg | F26B 17/122 34/218 |
| 2009/0158618 A1 * | 6/2009 | Tuck | F26B 17/026 34/639 |
| 2013/0071800 A1 * | 3/2013 | Gausmann | F27B 9/022 432/11 |
| 2014/0093828 A1 * | 4/2014 | Kinnunen | F23K 1/04 431/11 |

* cited by examiner

METHOD AND APPARATUS FOR USING EXCESS HEAT FROM POWER PLANT FLUE GAS TO DRY BIOMASS FUEL

CROSS-REFERENCE TO RELATED APPLICATIONS

This application is a continuation-in-part of International Patent Application No. PCT/CN2015/092501 with an international filing date of Oct. 22, 2015, designating the United States, now pending, and further claims foreign priority benefits to Chinese Patent Application No. 201410578212.8 filed Oct. 24, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method and a device for drying biomass fuel using waste heat of flue gas from a power plant.

Description of the Related Art

Typically, biomass fuel for use in a power plant is dried by open-air drying followed by machinery-based drying. Specifically, the biomass fuel is first air-dried to reduce the moisture content to a certain extent, and then is dried using drying machinery. However, the drying method has the following disadvantages:

1) The existing drying equipment is inefficient.
2) The existing drying equipment contributes to high generation cost.
3) The open-air drying occupies a large land area, involves heavy workload, and causes environmental problems.

SUMMARY OF THE INVENTION

In view of the above-described problems, it is one objective of the invention to provide a method and a device for drying biomass fuel using waste heat of flue gas from a power plant that feature relatively high drying efficiency and relatively low energy consumption.

To achieve the above objective, in accordance with one embodiment of the invention, there is provided a method for drying biomass fuel using waste heat of flue gas from a power plant, the method comprising:

1) stepwise recovering, by multi-stage condensation, sensible heat of flue gas; stepwise heating air using the sensible heat, to yield first-stage dry air and second-stage dry air, wherein a temperature of the first-stage dry air is higher than a temperature of the second-stage dry air; recovering latent heat of the flue gas as a heat source to exchange heat with air cooler tubes, to yield third-stage dry air, or collecting ambient cold air as the third-stage dry air, wherein a temperature of the third-stage dry air is lower than the temperature of the second-stage air;
2) convectively drying and dehydrating biomass fuel using the first-stage dry air having a temperature of between 150 and 180° C., a moisture content in the biomass fuel being reduced to between 30 and 50%;
3) further convectively drying and dehydrating the biomass fuel using the second-stage dry air having a temperature of between 80 and 100° C., the moisture content in the biomass fuel being reduced to between 25 and 30%; and
4) drying and dehydrating the biomass fuel using the third-stage dry air having a temperature of less than or equal to 25° C., the moisture content in the biomass fuel being reduced to less than 25%.

In a class of this embodiment, in 4), the biomass fuel is dried at a temperature of between 20 and 25° C. A relative humidity of the third-stage dry air is less than or equal to 15%, and a speed of the third-stage dry air is between 3 and 4 m/s.

In a class of this embodiment, in 2), the biomass fuel is dried at a temperature of between 150 and 160° C., and a speed of the first-stage dry air is between 3 and 4 m/s. In 3), the biomass fuel is dried at a temperature of between 80 and 90° C., and a speed of the second-stage dry air is between 3 and 4 m/s.

In a class of this embodiment, in 2), an initial moisture content in the biomass fuel is between 35 and 45%.

In a class of this embodiment, humid air resulting from the drying in 2) and 3) is collected, heated, dehumidified, and recycled.

The invention further provides a device for drying biomass fuel using waste heat of flue gas from a power plant comprising a multi-layer dryer. The multi-layer dryer comprises a drying room comprising multi-layer conveying belts. The multi-layer conveying belts are transversely disposed. The drying room comprises at least two transverse baffle plates. The at least two transverse baffle plates are configured to separate the multi-layer conveying belts in the drying room to form a first drying zone, a second drying zone, and a third drying zone from the top down. The first drying zone, the second drying zone, and the third drying zone are independently air-tight. A temperature in the second drying zone is higher than a temperature in the third drying zone and is lower than a temperature in the first drying zone. A first-stage dry air inlet is disposed on a front end of the first drying zone, and a first humid air outlet is disposed on a rear end of the first drying zone. A second-stage dry air inlet is disposed on a front end of the second drying zone, and a second humid air outlet is disposed on a rear end of the second drying zone. A third-stage dry air inlet is disposed on a front end of the third drying zone, and a third humid air outlet is disposed on a rear end of the third drying zone. A discharge chute is disposed between two ends of adjacent conveying belts, and the biomass fuel is transmitted from the top down by the discharge chute. The multi-layer dryer is connected to a first-stage flue gas condenser comprising a first water outlet and a first flue gas outlet. The first water outlet is connected to a first-stage gas-liquid heat exchanger. The first-stage gas-liquid heat exchanger comprises a first air outlet, and the first air outlet is connected to the first-stage dry air inlet. The first flue gas outlet is connected to a second-stage flue gas condenser. The second-stage flue gas condenser comprises a second water outlet and a second flue gas outlet. The second water outlet is connected to a second-stage gas-liquid heat exchanger comprising a second air outlet. The second air outlet is connected to the second-stage dry air inlet. The second flue gas outlet is connected to a latent heat recovery unit. The latent heat recovery unit comprises a third air outlet. The third air outlet is connected to air cooler tubes. The air cooler tubes comprise a fourth air outlet. The fourth air outlet is connected to the third-stage dry air inlet.

In a class of this embodiment, the device further comprises a third flue gas condenser and a third gas-liquid heat exchanger. The second flue gas outlet is connected to the third flue gas condenser. The third flue gas condenser comprises a third flue gas outlet and a third water outlet. The third flue gas outlet is connected to the latent heat recovery unit. The third water outlet is connected to the third gas-liquid heat exchanger. The third gas-liquid heat exchanger comprises a fifth air outlet, and the fifth air outlet is connected to the second-stage dry air inlet.

In a class of this embodiment, the multi-layer conveying belts are mesh belts or chain board belts comprising between 45 and 65% of vent holes in area.

In a class of this embodiment, the multi-layer conveying belts are disposed in parallel at equal intervals; and the multi-layer conveying belts and the at least two transverse baffle plates are disposed in parallel at equal intervals.

In a class of this embodiment, the first humid air outlet is connected to a first heat recovery unit. The second humid air outlet is connected to a second heat recovery unit.

The drying principle in the embodiments of the invention is as follows: the biomass fuel is dried in three stages: high-temperature quick drying, medium-temperature drying, and low-temperature drying. In the early stage, the temperature of dry air has a great influence on the drying rate, thus the first-stage dry air having a temperature of between 150 and 180° C. is used to dry the biomass fuel during the stage of high-temperature quick drying. As the first-stage dry air is under high temperature, the water on the fuel surface is evaporated quickly, thus during the high-temperature quick drying, the biomass fuel is dried in a relatively short period of time. Thereafter, water on the fuel surface is reduced, and the drying rate is decreased; therefore, in the stage of medium-temperature drying, as the influence of dry air temperature on the drying rate is correspondingly reduced, dry air needs not to be at a high temperature, and the dry air is at a temperature of between 80 and 100° C. Water on the fuel surface continues to be evaporated, and the temperature on the fuel surface is decreased due to the air speed. Temperature gradient inside out the biomass fuel is formed, and the internal water is moved to the surface of the biomass fuel. During the medium-temperature drying, as the temperature gradient and the moisture gradient are rather small, a hot surface saturated with water takes a long time to form, and the drying rate is almost constant. Following the exchange of heat and humidity in the medium-temperature drying, the pressure differences of the temperature gradient and the moisture gradient decrease, and the drying rate drops sharply, therefore, in the stage of low-temperature drying, high-temperature dry air is replaced by low-temperature dry-air to dry the biomass fuel so as to improve the drying rate. In winter, the ambient air is directly used. In summer or transitional season, the air temperature is controlled to be lower than 25° C., or preferably at a temperature of between 20 and 25° C., and an even colder air temperature is preferred. Due to the introduction of low-temperature dry air, the pressure differences of temperature gradient and moisture gradient between the biomass fuel and the low-temperature dry air increase. The biomass fuel releases heat to the air, and water on the fuel surface also spreads to the air. The direction of the temperature gradient and the direction of the moisture gradient are identical, thus the drying of the biomass fuel in the stage of the low-temperature drying is accelerated.

Advantages of the method and the device for drying biomass fuel according to embodiments of the invention are summarized as follows:

1. Conventional flue gas utilization in the biomass power plant is to preheat air using an air-preheater to assist combustion. The final flue gas temperature is set to be around 150° C., and the thermal efficiency is about 48%. In the embodiments of the invention, the waste heat of flue gas is recovered stepwise to dry the biomass fuel, and a total thermal efficiency reaches 86.5%. In addition, latent heat released from condensation of vapor in the flue gas is completely utilized. Because the temperature of latent heat is relatively low, a cold tube technology is introduced, and the low-grade heat extracted from the latent heat is fully utilized. The fuel drying broadens the application of waste heat in the flue gas, and the thermal efficiency of the boiler is over 100%. According to estimates, the thermal efficiency of the boiler, taking the latent heat utilization into account, is as high as 136%.

2. The waste heat recovery of flue gas from a power plant is associated with the high-temperature, medium-temperature, and low-temperature drying of biomass fuel, and the biomass fuel is dried in multiple stages by high-temperature and low-temperature dry air, therefore making the most of energy, improving the drying efficiency, saving energy, and reducing emission. The cost of energy consumption is reduced significantly. Meanwhile, land occupation, heavy workload, and environmental problems caused by open-air drying of biomass fuel is avoided.

3. As the waste heat in the flue gas is recovered stepwise, the sensible heat is effectively recovered, and the latent heat released from vapor condensation is fully utilized as well, thus improving the utilization efficiency of waste heat in the flue gas, lowering discharge of carbon dioxide and heat, and reducing pollution caused by flue gas and waste heat.

4. Multi-layer conveying belts and air cooler tubes are used to achieve continuous drying in three stages: high-temperature drying at high speed, medium-temperature drying at constant speed, and low-temperature drying at accelerated speed, thus the drying efficiency is improved, and fuel supply demand is satisfied. The biomass fuel exchanges heat and humidity with the high-temperature air and the low-temperature air on the multi-layer conveying belts. Transverse baffle plates are configured to separate belts in the drying room to form a first drying zone, a second drying zone, and a third drying zone, thus effectively preventing cross flow of the air at different temperatures, and further improving drying efficiency.

5. The utilization of the air cooler tubes including heat recovery, dehumidification, and cooling is creative. The air cooler tubes are a combination of adsorber, condenser, and evaporator, feature good heat and mass transfer effect, and require less transmission equipment, thus the air cooler tubes are low-cost, easy to manufacture and use.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method and a device for drying biomass fuel using waste heat of flue gas from a power plant are described below. It should be noted that the following examples are intended to describe and not to limit the invention.

Figure 3:
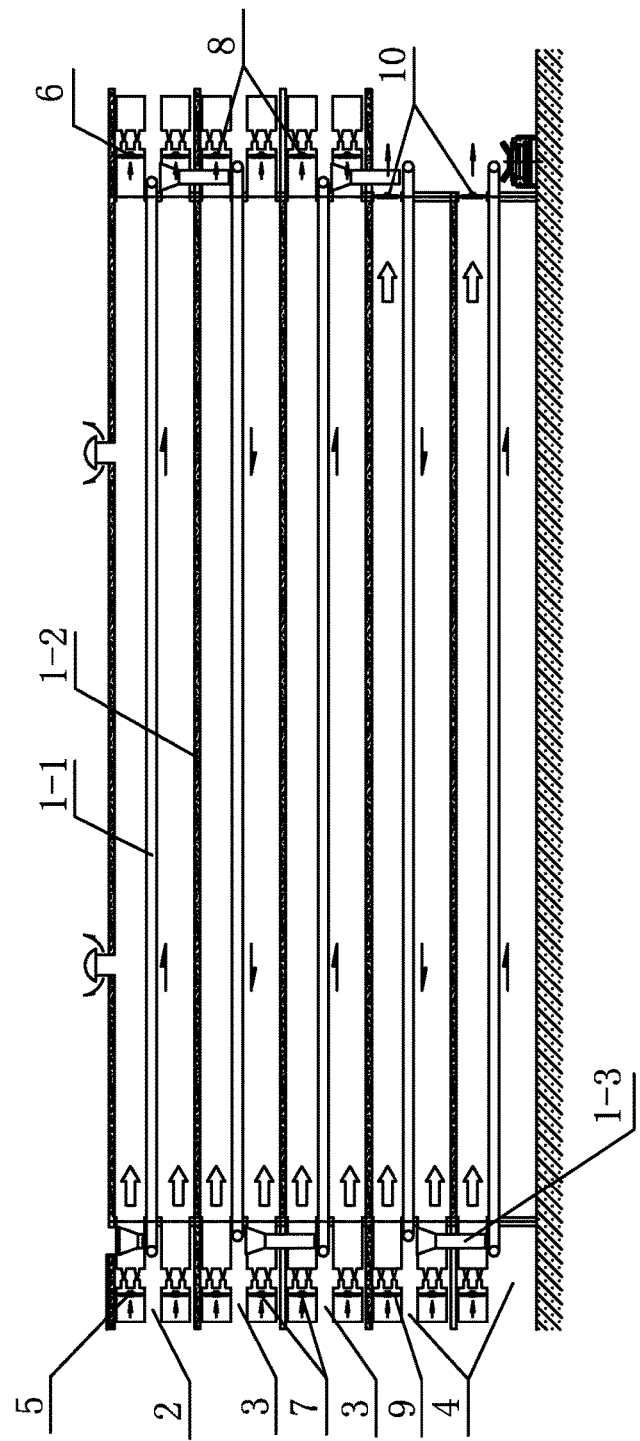
FIG. 3 is a partial enlarged view of FIG. 2.

As shown in FIGS. 1-4, a device for drying biomass fuel using waste heat of flue gas from a power plant comprises a multi-layer dryer 1. The multi-layer dryer 1 comprises a drying room comprising multi-layer conveying belts 1-1. The multi-layer conveying belts are transversely disposed according to the scale of drying. The multi-layer conveying belts 1-1 are mesh belts or chain board belts which run on a round trip. The multi-layer conveying belts are mesh belts or chain board belts comprising between 45 and 65% of vent holes in area. The drying room comprises a plurality of two transverse baffle plates 1-2 which is parallel to the multi-layer conveying belts 1-1. The multi-layer conveying belts 1-1 are disposed in parallel at equal intervals. The multi-layer conveying belts 1-1 and the at least two transverse baffle plates 1-2 are disposed in parallel at equal intervals. The at least two transverse baffle plates 1-2 are configured to separate the multi-layer conveying belts 1-1 in the drying room to form a first drying zone 2, two second drying zones 3, and a third drying zone 4 from the top down. The first drying zone, the second drying zone, and the third drying zone are independently air-tight. A temperature in the second drying zone is higher than a temperature in the third drying zone, and is lower than a temperature in the first drying zone. The front end of the first drying zone 2 is provided with a first-stage dry air inlet 5, and a first humid air outlet 6 is disposed on a rear end of the first drying zone. The front end of the second drying zone 3 is provided with a second-stage dry air inlet 7, and a second humid air outlet 8 is disposed on a rear end of the second drying zone. The front end of the third drying zone 4 is provided with a third-stage dry air inlet 9, and a third humid air outlet 10 is disposed on a rear end of the third drying zone. Discharge chutes 1-3 are disposed between two ends of the adjacent conveying belts 1-1, respectively, as shown in FIG. 3, as such, the biomass fuel is transmitted from the top down through the discharge chute in a serpentine mode. The multi-layer dryer 1 comprises a first-stage flue gas condenser 11 comprising a first water outlet and a first flue gas outlet. The first water outlet of the first-stage flue gas condenser 11 is connected to a first-stage gas-liquid heat exchanger 12. The first-stage gas-liquid heat exchanger 12 comprises a first air outlet, and the first air outlet is connected to the first-stage dry air inlet 5. The first humid air outlet 6 is connected to a first heat recovery unit 19. The first flue gas outlet of the first-stage flue gas condenser 11 is connected to a second-stage flue gas condenser 13. The second-stage flue gas condenser 13 comprises a second water outlet and a second flue gas outlet. The second water outlet is connected to a second-stage gas-liquid heat exchanger 14 comprising a second air outlet. The second air outlet of the second-stage gas-liquid heat exchanger 14 is connected to the second-stage dry air inlet 7. The second flue gas outlet of the second-stage flue gas condenser 13 is connected to a third flue gas condenser 17 comprising a third flue gas outlet and a third water outlet. The third water outlet of the third flue gas condenser 17 is connected to a third gas-liquid heat exchanger 18 comprising a fifth air outlet. The fifth air outlet is connected to the second-stage dry air inlet 7. Two second humid air outlets 8 each are connected to a second heat recovery unit 20. The third flue gas outlet of the third flue gas condenser 17 is connected to a latent heat recovery unit 15 comprising a third air outlet. The third air outlet of the latent heat recovery unit 15 is connected to air cooler tubes 16. The air cooler tubes 16 comprise a fourth air outlet. The fourth air outlet is connected to the third-stage dry air inlet 9 of the third drying zone 4.

Figure 4:
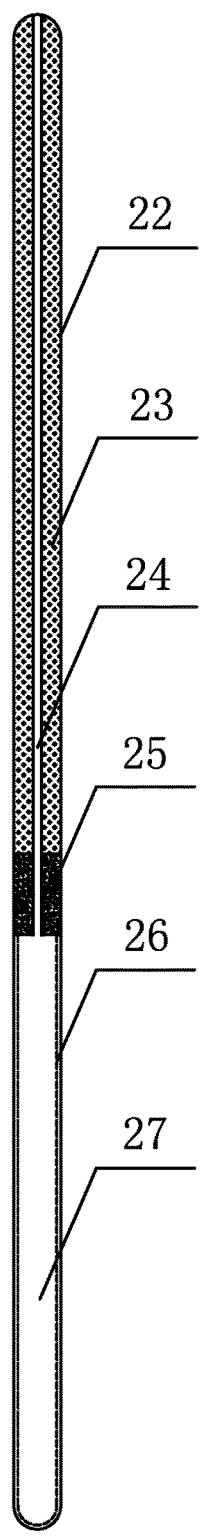
FIG. 4 is a schematic diagram of an air cooler tube of a device for drying biomass fuel using waste heat of flue gas from a power plant in accordance with one embodiment of the invention.

As shown in FIG. 4, the air cooler tubes 16 are an energy-saving device for cooling air. An upper segment of the air cooler tubes 16 is an absorption segment 22. The adsorption segment 22 is filled with adsorbent 23. A lower segment of the air cooler tubes 16 is a condensation segment 27. A heat-insulating layer 25 is disposed between the adsorption segment 22 and the condensation segment 27. An inner layer 26 of steel mesh and an adsorbate channel 24 are disposed in the air cooler tubes 16. During the desorption process, the air is cooled and humidified when passing through the adsorption segment, and isenthalpic heating is performed on the air when the air is passing through the condensation segment. During the adsorption process, the air is heated and dried when passing through the adsorption segment, and isenthalpic cooling is performed on the air when the air is passing through the condensation segment. Therefore, in actual operation, at least two groups of air cooler tubes are needed: one group of air cooler tubes are used for desorption and another group of air cooler tubes are used for adsorption. The waste heat of flue gas is used as a heat source of the air cooler tubes for the desorption process of one group of air cooler tubes, and then the cooled gas enters another group of air cooler tubes to perform the adsorption process. The cooled air produced at the condensation segment is meant for the low-temperature drying of the biomass fuel.

Figure 1:
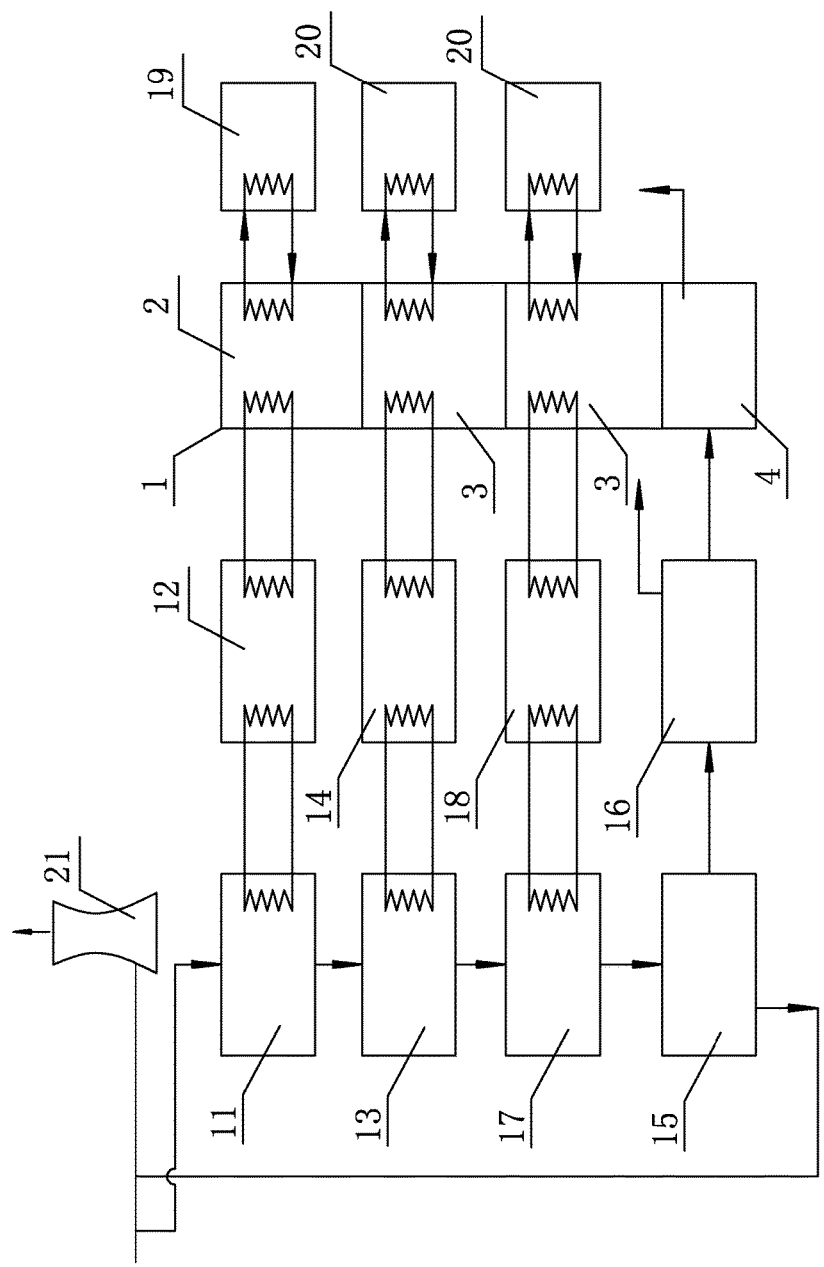
FIG. 1 is a schematic diagram of a device for drying biomass fuel using waste heat of flue gas from a power plant in accordance with one embodiment of the invention.
Figure 2:
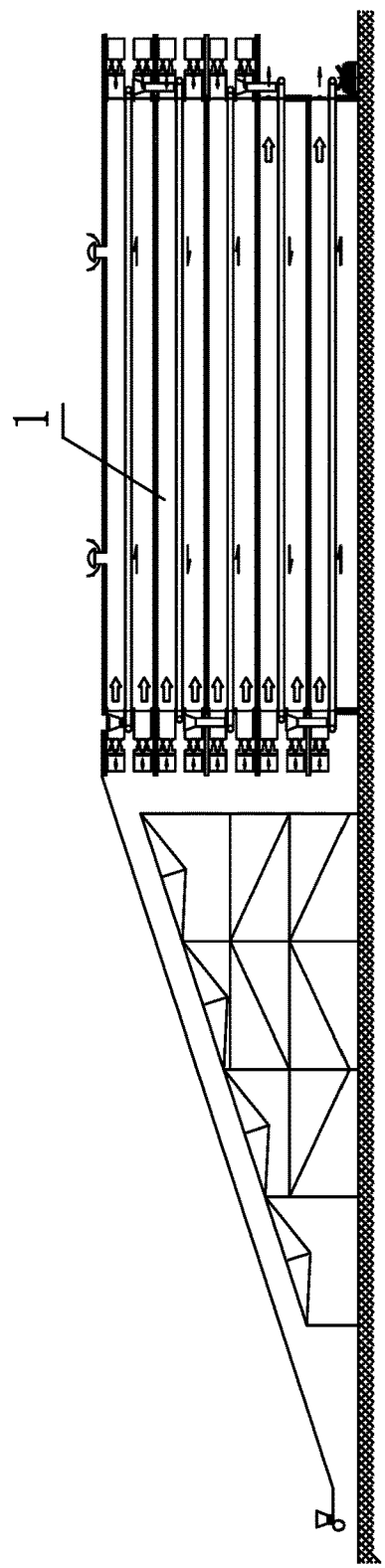
FIG. 2 is a schematic diagram of multi-layer conveying belts of a device for drying biomass fuel using waste heat of flue gas from a power plant in accordance with one embodiment of the invention.

The process of drying biomass fuel using waste heat of flue gas from a power plant by the device is as follows:

1) Heating air stepwise using waste heat of flue gas: as shown in FIG. 1, following dust removal, a small part of the flue gas from the power plant is exhausted from the chimney 21, so as to ensure normal discharge of flue gas. A major part of the glue gas (75% of the flue gas is optional) is utilized in four stages. The flue gas flows through the first-stage flue gas condenser 11, the second-stage flue gas condenser 13, the third flue gas condenser 17, and the latent heat recovery unit 15 for heat recovery. A temperature of flue gas at an inlet of the first-stage flue gas condenser 11 is 290° C., and a temperature of flue gas at the first flue gas outlet is 190° C. A thermal efficiency is 35%. A temperature of flue gas at an inlet of the second-stage flue gas condenser 13 is 190° C., and a temperature of flue gas at the second flue gas outlet is 150° C. A thermal efficiency is 13.5%. A temperature of flue gas at an inlet of the third flue gas condenser 17 is 150° C., and a temperature of flue gas at the third flue gas outlet is 100° C. A thermal efficiency is 17%. A thermal efficiency is 13.5%. A temperature of flue gas at an inlet of the latent heat recovery unit 15 is 100° C., and a temperature of flue gas at a fourth flue gas outlet is 40° C. A thermal efficiency is 21%. The high-temperature water from the first water outlet of the first-stage flue gas condenser 11 exchanges heat with air in the first-stage gas-liquid heat exchanger 12 to yield the first-stage dry air having a temperature of between 150 and 180° C., and at a preferable temperature of between 150 and 160° C. The high-temperature water from the second water outlet of the second-stage flue gas condenser 13 exchanges heat with air in the second-stage gas-liquid heat exchanger 14 to yield the second-stage dry air having a temperature of between 80 and 100° C., and at a preferable temperature of between 80 and 90° C. The high-temperature water from the third water outlet of the third flue gas condenser 17 exchanges heat with air in the third gas-liquid heat exchanger 18 to yield the second-stage dry air having a temperature of between 80 and 100° C., and at a preferable temperature of between 80 and 90° C. The latent heat recovery unit 15 is configured to extract sensible heat as well as a part of latent heat. Hot air produced by the latent heat recovery unit 15 is processed by the air cooler tubes to yield the third-stage dry air having a temperature of less than or equal to 25° C. and heat source. The heat source is used for heating or hot water supply. The flue gas output from the latent heat recovery unit 15 is discharged by the chimney 21.

2) Multi-stage drying using hot air and cold air: as shown in FIG. 3, in the sealed drying room of the multi-layer dryer 1, adjacent conveying belts 1-1 run towards opposite directions. The biomass fuel is sent to the top belt 1-1, and drops from the top down. The biomass fuel is transmitted by an S-shaped structure and is discharged from a discharge outlet of a lowest belt 1-1. As the biomass fuel is on the belts, air is ejected from a powerful nozzle to no less than 15 m. The first-stage dry air produced by exchanging heat with water from the first-stage flue gas condenser is input from the first-stage dry air inlet 5 to the first drying zone 2 in the multi-layer dryer 1 at a speed between 3 and 4 m/s. The biomass fuel with the moisture content between 35 and 40% on the belts 1-1 is quick dried by the first-stage dry air, and the moisture content is decreased to between 30 and 35%. Meanwhile, the second-stage dry air produced by exchanging heat with water from the second-stage flue gas condenser and the third flue gas condenser is input from the second-stage dry air inlet 7 to the second drying zone 3 in the multi-layer dryer 1 at a speed between 3 and 4 m/s. The biomass fuel on the belts 1-1 is dried by the second-stage dry air, and the moisture content is decreased to between 25 and 30%. Low-temperature and humid air produced during the drying by the first-stage dry air and the second-stage dry air is heated and dried by the first heat recovery unit 19 and the second heat recovery unit 20, then recycled in the system. The third-stage dry air is input from the third-stage dry air inlet 9 to the third drying zone 4 in the multi-layer dryer 1 for cold drying the biomass fuel at a temperature of between 10 and 15° C. and at a speed between 3 and 4 m/s. A relative humidity of the third-stage dry air is less than or equal to 15%. The moisture content in the biomass fuel is decreased to less than 25%. The cold air which absorbs moisture from the fuel can be recycled through the air cooler tubes 16. In conclusion, hot air in the first drying zone 2 and the second drying zone 3 of the multi-layer dryer 1 is heated stepwise using waste heat of flue gas. Cold air in the third drying zone 4 can use ambient air in winter, or the cold air is prepared by the air cooler tubes 16 using latent heat in the flue gas as heat source in summer or transitional season. The cold source in winter can be stored as auxiliary cold supply.

Experiments show that the total thermal efficiency of the waste heat of flue gas is above 85%, thus the energy consumption for drying biomass fuel is effectively decreased, and the pre-processing cost of the biomass fuel is significantly reduced.

The invention claimed is:

1. A method for drying biomass fuel using waste heat of flue gas from a power plant, the method comprising:
1) stepwise recovering, by multi-stage condensation, sensible heat of flue gas; stepwise heating air using the sensible heat, to yield first-stage dry air and second-stage dry air, wherein a temperature of the first-stage dry air is higher than a temperature of the second-stage dry air; recovering latent heat of the flue gas as a heat source to exchange heat with air cooler tubes, to yield third-stage dry air, or collecting ambient cold air as the third-stage dry air, wherein a temperature of the third-stage dry air is lower than the temperature of the second-stage air;
2) convectively drying and dehydrating biomass fuel using the first-stage dry air having a temperature of between 150 and 180° C., a moisture content in the biomass fuel being reduced to between 30 and 50%;
3) further convectively drying and dehydrating the biomass fuel using the second-stage dry air having a temperature of between 80 and 100° C., the moisture content in the biomass fuel being reduced to between 25 and 30%; and
4) drying and dehydrating the biomass fuel using the third-stage dry air having a temperature of less than or equal to 25° C., the moisture content in the biomass fuel being reduced to less than 25%.

2. The method of claim 1, wherein in 4), the biomass fuel is dried at a temperature of between 20 and 25° C.; a relative humidity of the third-stage dry air is less than or equal to 15%; and a speed of the third-stage dry air is between 3 and 4 m/s.

3. The method of claim 1, wherein in 2), the biomass fuel is dried at a temperature of between 150 and 160° C., and a speed of the first-stage dry air is between 3 and 4 m/s; and in 3), the biomass fuel is dried at a temperature of between 80 and 90° C., and a speed of the second-stage dry air is between 3 and 4 m/s.

4. The method of claim 2, wherein in 2), the biomass fuel is dried at a temperature of between 150 and 160° C., and a speed of the first-stage dry air is between 3 and 4 m/s; and in 3), the biomass fuel is dried at a temperature of between 80 and 90° C., and a speed of the second-stage dry air is between 3 and 4 m/s.

5. The method of claim 1, wherein humid air resulting from the drying in 2) and 3) is collected, heated, dehumidified, and recycled.

6. The method of claim 2, wherein humid air resulting from the drying in 2) and 3) is collected, heated, dehumidified, and recycled.

7. A device for drying biomass fuel using waste heat of flue gas from a power plant, the device comprising:
a multi-layer dryer, the multi-layer dryer comprising a drying room comprising multi-layer transversely-disposed conveying belts, at least two transverse baffle plates, and discharge chutes connecting adjacent conveying belts;
a first-stage flue gas condenser comprising a first water outlet and a first flue gas outlet;
a first-stage gas-liquid heat exchanger comprising a first air outlet;
a second-stage flue gas condenser comprising a second water outlet and a second flue gas outlet;
a second-stage gas-liquid heat exchanger comprising a second air outlet;
a latent heat recovery unit comprising a third air outlet; and
air cooler tubes comprising a fourth air outlet;
wherein
the at least two transverse baffle plates are configured to separate the multi-layer conveying belts in the drying room to form a first drying zone, a second drying zone, and a third drying zone from the top down; the first drying zone, the second drying zone, and the third drying zone are independently air-tight; a temperature in the second drying zone is higher than a temperature in the third drying zone, and is lower than a temperature in the first drying zone;

a first-stage dry air inlet is disposed on a front end of the first drying zone, and a first humid air outlet is disposed on a rear end of the first drying zone; a second-stage dry air inlet is disposed on a front end of the second drying zone, and a second humid air outlet is disposed on a rear end of the second drying zone; a third-stage dry air inlet is disposed on a front end of the third drying zone, and a third humid air outlet is disposed on a rear end of the third drying zone;

the discharge chutes are disposed between two ends of the adjacent conveying belts, respectively, and the biomass fuel is transmitted from the top down through the discharge chutes in a serpentine mode;

the multi-layer dryer is connected to the first-stage flue gas condenser; the first water outlet of the first-stage flue gas condenser is connected to the first-stage gas-liquid heat exchanger; the first air outlet of the first-stage gas-liquid heat exchanger is connected to the first-stage dry air inlet; the first flue gas outlet of the first-stage flue gas condenser is connected to the second-stage flue gas condenser;

the second water outlet of the second-stage flue gas condenser is connected to the second-stage gas-liquid heat exchanger; the second air outlet of the second-stage gas-liquid heat exchanger is connected to the second-stage dry air inlet; the second flue gas outlet of the second-stage flue gas condenser is connected to the latent heat recovery unit; and the third air outlet of the latent heat recovery unit is connected to the air cooler tubes; and the fourth air outlet of the air cooler tubes is connected to the third-stage dry air inlet.

8. The device of claim 7, wherein the device further comprises a third flue gas condenser and a third gas-liquid heat exchanger; the second flue gas outlet of the second-stage flue gas condenser is connected to the third flue gas condenser; the third flue gas condenser comprises a third flue gas outlet and a third water outlet; the third flue gas outlet of the third flue gas condenser is connected to the latent heat recovery unit; the third water outlet of the third flue gas condenser is connected to the third gas-liquid heat exchanger; the third gas-liquid heat exchanger comprises a fifth air outlet, and the fifth air outlet is connected to the second-stage dry air inlet.

9. The device of claim 7, wherein the multi-layer conveying belts are mesh belts or chain board belts comprising between 45 and 65% of vent holes in area.

10. The device of claim 8, wherein the multi-layer conveying belts are mesh belts or chain board belts comprising between 45 and 65% of vent holes in area.

11. The device of claim 7, wherein the multi-layer conveying belts are disposed in parallel at equal intervals; and the multi-layer conveying belts and the at least two transverse baffle plates are disposed in parallel at equal intervals.

12. The device of claim 8, wherein the multi-layer conveying belts are disposed in parallel at equal intervals; and the multi-layer conveying belts and the at least two transverse baffle plates are disposed in parallel at equal intervals.

13. The device of claim 7, wherein the first humid air outlet is connected to a first heat recovery unit; and the second humid air outlet is connected to a second heat recovery unit.

14. The device of claim 8, wherein the first humid air outlet is connected to a first heat recovery unit; and the second humid air outlet is connected to a second heat recovery unit.

\* \* \* \* \*